United States Patent
Nguyen et al.

(10) Patent No.: US 8,566,652 B1
(45) Date of Patent: *Oct. 22, 2013

(54) COMMAND QUEUING IN DISK DRIVES

(75) Inventors: Huy Tu Nguyen, Laguna, CA (US);
William C Wong, Cerritos, CA (US);
Kha Nguyen, Anaheim, CA (US);
Yehua Yang, Las Flores, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,492

(22) Filed: Apr. 6, 2012

Related U.S. Application Data

(63) Continuation of application No. 12/323,267, filed on Nov. 25, 2008, now Pat. No. 8,156,415.

(60) Provisional application No. 61/016,667, filed on Dec. 26, 2007.

(51) Int. Cl.
*G06F 3/00* (2006.01)

(52) U.S. Cl.
USPC .................................. 714/48; 701/5

(58) Field of Classification Search
USPC ........................ 714/807, 48; 710/5
See application file for complete search history.

(56) References Cited

U.S. PATENT DOCUMENTS

| | | | |
|---|---|---|---|
| 4,789,994 A | 12/1988 | Randall et al. | |
| 4,888,691 A * | 12/1989 | George et al. | 714/15 |
| 5,426,736 A * | 6/1995 | Guineau, III | 710/56 |
| 5,509,134 A * | 4/1996 | Fandrich et al. | 711/103 |
| 5,640,596 A * | 6/1997 | Takamoto et al. | 710/21 |
| 5,644,786 A * | 7/1997 | Gallagher et al. | 710/30 |
| 5,687,390 A * | 11/1997 | McMillan, Jr. | 710/5 |
| 5,701,516 A * | 12/1997 | Cheng et al. | 710/22 |
| 5,809,543 A * | 9/1998 | Byers et al. | 711/162 |
| 5,835,783 A * | 11/1998 | Grimsrud | 710/8 |
| 5,909,384 A | 6/1999 | Tal et al. | |
| 5,978,856 A * | 11/1999 | Jones | 711/114 |
| 6,157,962 A * | 12/2000 | Hodges et al. | 710/1 |
| 6,170,042 B1 | 1/2001 | Gaertner et al. | |
| 6,272,565 B1 * | 8/2001 | Lamberts | 710/43 |
| 6,292,856 B1 | 9/2001 | Marcotte | |
| 6,334,162 B1 * | 12/2001 | Garrett et al. | 710/54 |
| 6,487,615 B1 * | 11/2002 | Hunsaker | 710/52 |
| 6,745,266 B1 | 6/2004 | Johnson et al. | |
| 6,745,303 B2 | 6/2004 | Watanabe | |
| 6,789,132 B2 * | 9/2004 | Hoskins | 710/5 |
| 6,892,250 B2 | 5/2005 | Hoskins | |
| 6,925,539 B2 | 8/2005 | Mowery et al. | |
| 7,043,567 B2 | 5/2006 | Trantham | |
| 7,133,940 B2 * | 11/2006 | Blightman et al. | 710/22 |

(Continued)

OTHER PUBLICATIONS

"Notiice of Allowance", U.S. Appl. No. 12/403,243, Sep. 28, 2012, 4 pages.

(Continued)

*Primary Examiner* — Stephen M Baker

(57) ABSTRACT

A method and system for command queuing in disk drives may improve performance by queuing multiple commands and sequentially executing them automatically without firmware intervention. The method may use a number of queues, e.g., a staging queue for commands to be executed, an execution queue for commands currently being executed, or a holding queue for commands which may have been executed but have not received a status report from a host.

20 Claims, 6 Drawing Sheets

(56) References Cited

U.S. PATENT DOCUMENTS

| | | |
|---|---|---|
| 7,158,324 B2 | 1/2007 | Stein et al. |
| 7,194,607 B2 | 3/2007 | Dahlen et al. |
| 7,203,232 B2 | 4/2007 | Ahn |
| 7,225,391 B1 | 5/2007 | Bain |
| 7,234,033 B2 * | 6/2007 | Watanabe .................. 711/162 |
| 7,330,068 B2 | 2/2008 | Barksdale |
| 7,421,614 B2 | 9/2008 | Watanabe |
| 7,849,259 B1 | 12/2010 | Wong et al. |
| 7,987,396 B1 | 7/2011 | Riani |
| 8,099,655 B1 | 1/2012 | Tan et al. |
| 8,145,976 B1 | 3/2012 | Yeo |
| 8,156,415 B1 | 4/2012 | Nguyen |
| 8,370,717 B1 | 2/2013 | Geddes et al. |
| 2006/0146926 A1 | 7/2006 | Bhoja et al. |
| 2007/0101075 A1 | 5/2007 | Jeddeloh |
| 2008/0162806 A1 | 7/2008 | Gopal et al. |
| 2009/0135035 A1 | 5/2009 | Fifield |

OTHER PUBLICATIONS

"Notice of Allowance", U.S. Appl. No. 12/323,267, Dec. 6, 2011, 6 pages.

"Notice of Allowance", U.S. Appl. No. 12/556,483, Mar. 29, 2011, 6 pages.

"Notice of Allowance", U.S. Appl. No. 12/120,483, Nov. 25, 2011, 8 pages.

"Supplemental Notice of Allowance", U.S. Appl. No. 12/323,267, Mar. 15, 2012, 2 pages.

"Non-Final Office Action", U.S. Appl. No. 12/403,243, (May 21, 2012), 9 pages.

Thomasian, Alexander et al., "Higher Reliability Redundant Disk Arrays: Organization, Operation, and Coding", ACM Transactions on Storage, vol. 5, No. 3, Article 7, (Nov. 2009), pp. 1-59.

\* cited by examiner

COMMAND QUEUING IN DISK DRIVES

RELATED APPLICATIONS

This present disclosure is a continuation of and claims priority to U.S. Utility application Ser. No. 12/323,267 filed Nov. 25, 2008 and further claims priority to U.S. Provisional Patent Application Ser. No. 61/016,667 filed Apr. 11, 2008, both of which the disclosures are incorporated by reference herein in their entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

In currently available disk drives, a controller (e.g., firmware) may issue a command for transferring some data to a host, hardware of the disk drive may execute the command, and the host may send a status report back to the firmware, indicating whether the command is executed successfully. The firmware may issue the command again if there is an error, or move to the next command if the transmission is successful. This process is not very efficient since the firmware needs to wait for the status report.

SUMMARY

This summary is provided to introduce subject matter that is further described below in the Detailed Description and Drawings. Accordingly, this Summary should not be considered to describe essential features nor used to limit the scope of the claimed subject matter A method and system is disclosed for command queuing for disk drives which may improve performance by queuing multiple commands and automatically sequentially executing them without firmware intervention. The method may use a number of queues, e.g., a staging queue for commands to be executed, an execution queue for commands currently being executed, and a holding queue for commands which have been executed but have not received a status report from a host. With the pipelined nature of queued commands, when data requested by one command are being sent to the host, the queue logic may already be fetching data for the next command. If an error occurs during the transmission, commands in the queues may backtrack and restart from the point where data were last known to have been successfully sent to the host. Advantages of the present invention will become apparent from the following detailed description.

BRIEF DESCRIPTION OF THE DRAWINGS

Aspects of the present disclosure are described herein with reference to the accompanying drawings, similar reference numbers being used to indicate functionally similar elements.

DETAILED DESCRIPTION

Figure 1:
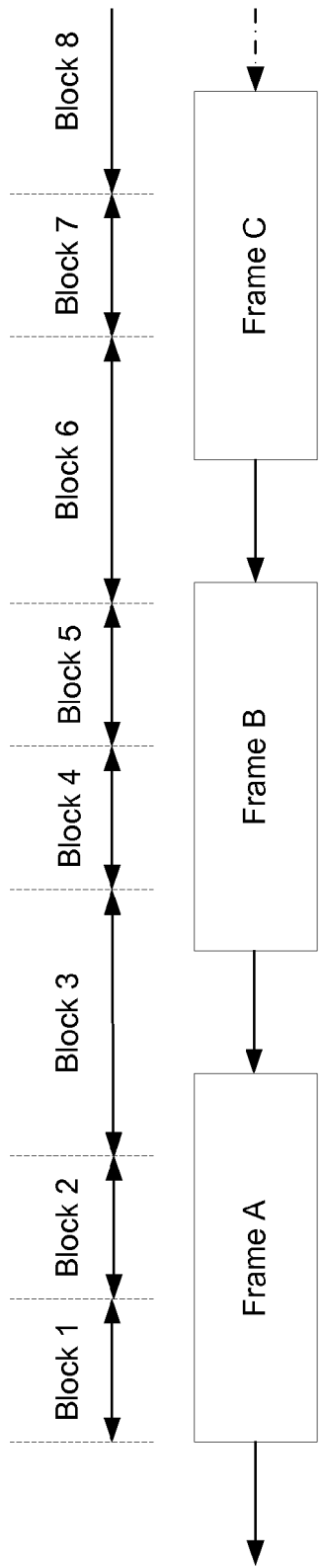
FIG. 1 illustrates a data stream to be transferred to a host.

FIG. 1 illustrates an exemplary data stream to be transferred to a host. As shown, each command may include a number of data blocks (e.g., blocks 1-8), and each block may contain a number of bytes (e.g., 512 bytes). Data may be transmitted to a host as a series of frames (e.g., frames A, B and C). A frame size may have no correlation to a block size. For example, an FC (Fiber Channel) frame payload may have 0 to 2112 bytes, and an SAS (Serial-Attached Small Computer System Interface) frame payload may have 1 to 1024 bytes. In FIG. 1, as an example, frame A may include blocks 1 and 2 and part of block 3, and frame B may include part of block 3, blocks 4 and 5, and part of block 6. The data stream shown in FIG. 1 may be used for FC or SAS.

Figure 2:
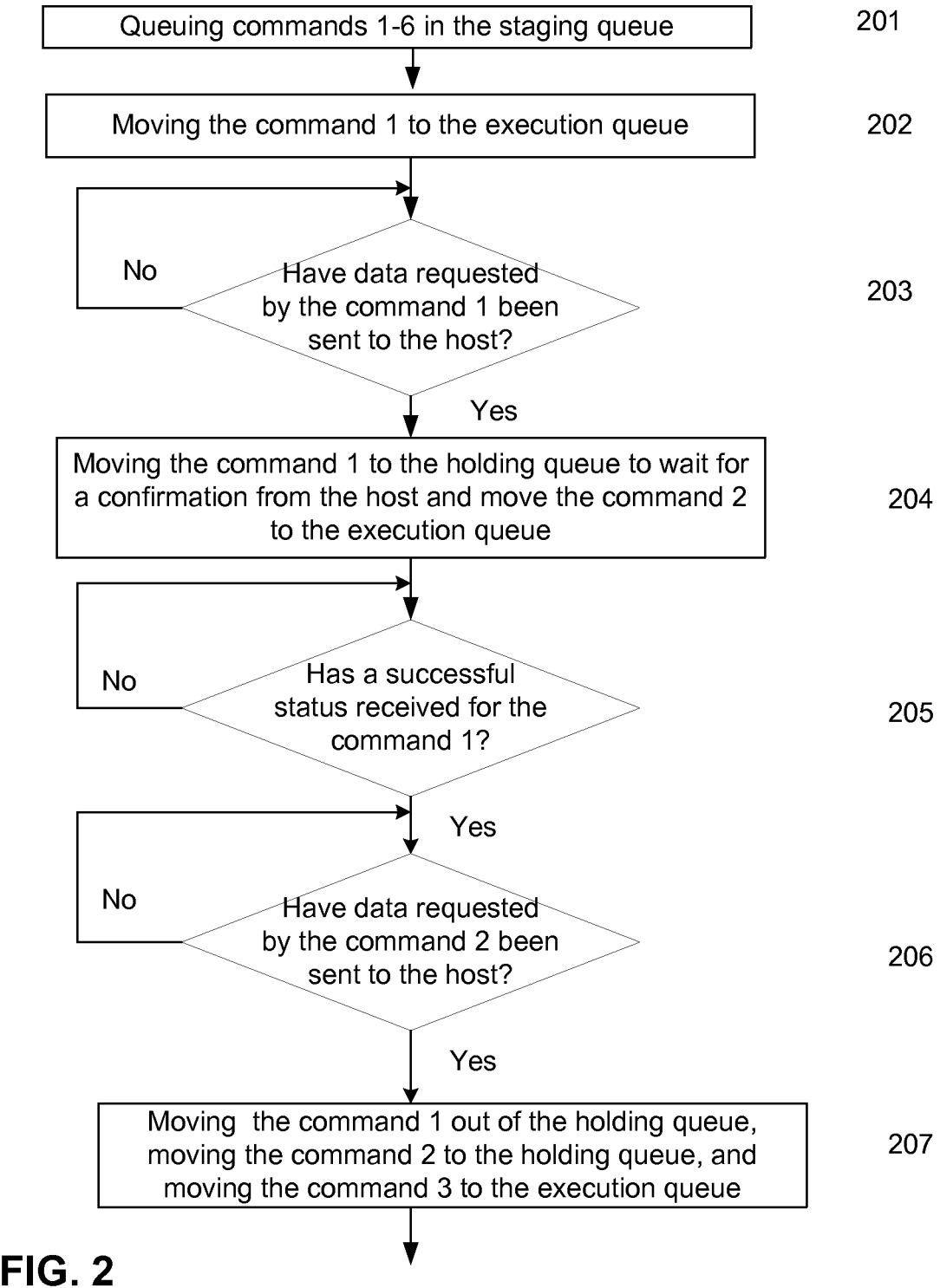
FIG. 2 illustrates a flowchart of a command queuing operation according to one aspect of the present invention.

FIG. 2 illustrates a flowchart of a command queuing operation according to one aspect of the present invention, and FIGS. 3A-3D illustrate queue status during a command queuing operation according to one aspect of the present invention.

Figure 3A:
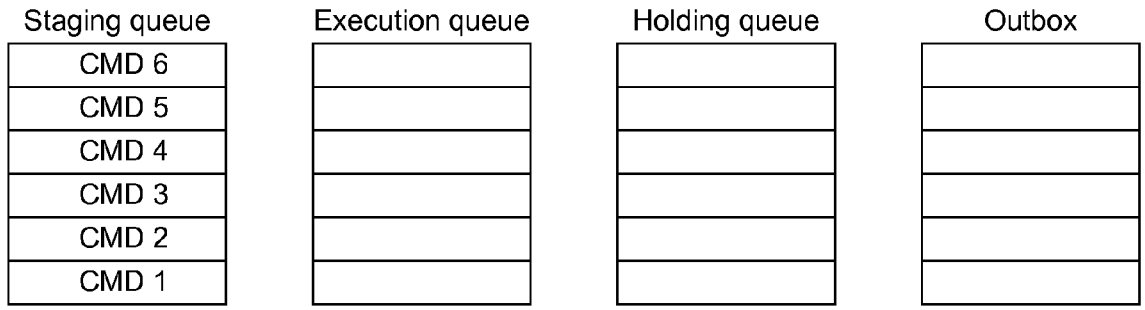
FIGS. 3A-3D illustrate queue status during a command queuing operation according to one aspect of the present invention.

At 201, firmware may write to a staging queue a number commands, e.g., commands 1-6. The commands may request data transfer to a host. As shown in FIG. 3A, command 1 is at the front of the staging queue.

Figure 3B:
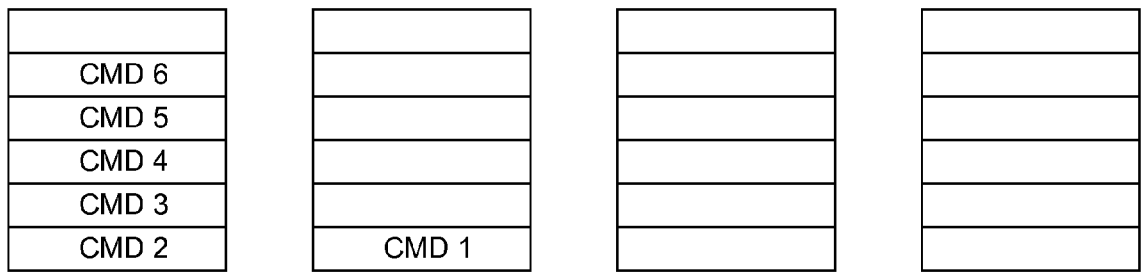

At 202, command 1 may initiate a request for data transfer and move to an execution queue, as shown in FIG. 3B. Command 2 may move to the front of the staging queue.

At 203, data requested by command 1 may be sent to a host.

Figure 3C:
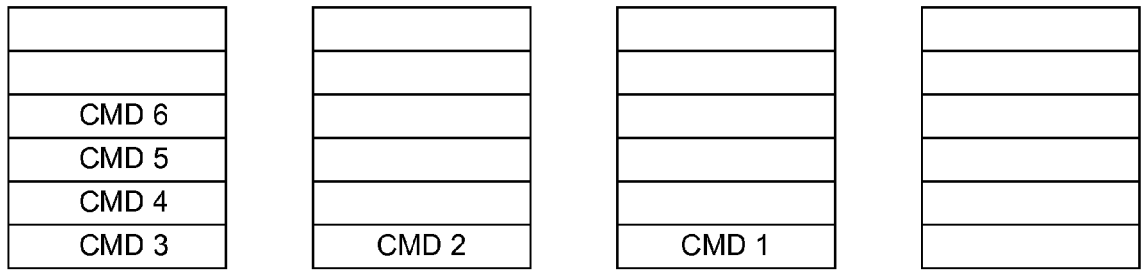

At 204, after all data requested by command 1 have been sent to the host, command 1 may move from the execution queue to a holding queue to wait for a status report from the host. As shown in FIG. 3C, while command 1 is waiting for the status report in the holding queue, command 2 at the front of the staging queue may initiate a request for data transfer and move to the execution queue, and command 3 may percolate to the front of the staging queue. Command 1 may stay in the holding queue until the firmware receives a status report from the host. If all data for command 2 have been sent to the host before a status report for command 1 is received by the firmware, transmission may stop with command 2 in the execution queue and command 3 at the front of the staging queue.

Figure 3D:
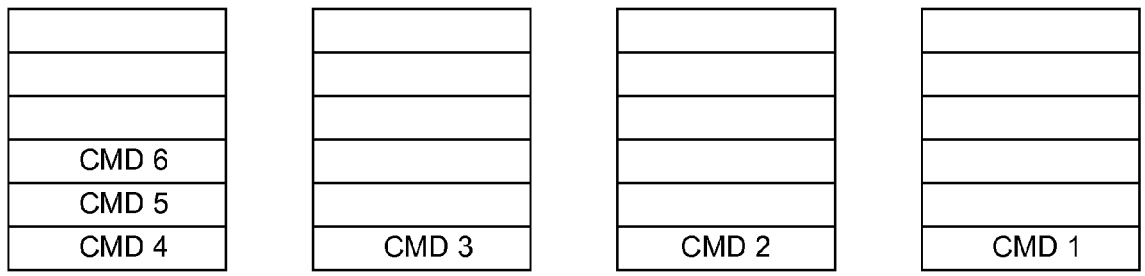

If the firmware receives a successful status report for command 1 from the host at 205, command 1 may move to an out box at 206. Meanwhile, if the data requested by command 2 have been transferred to the host at 207, at 208, command 2 may move to the holding queue to wait for a status report there, command 3 may initiate a request for data transfer and move to the execution queue, and command 4 may percolate to the front of the staging queue, as shown in FIG. 3D. Thus, when command 1 is waiting for its status report, the hardware of the disk drive may execute command 2, thus reducing the waiting time and improving performance of the disk drive.

In one aspect, command 2 may move to the holding queue before command 1 leaves the holding queue. In one aspect, more commands may be put into the execution queue and/or the holding queue, as long as the command in the holding queue whose status is unsuccessful can be put back to the staging queue as the front entry during a restart operation. In one aspect, 205 and 207 may happen simultaneously, and 206 and 208 may happen simultaneously.

Figure 4:
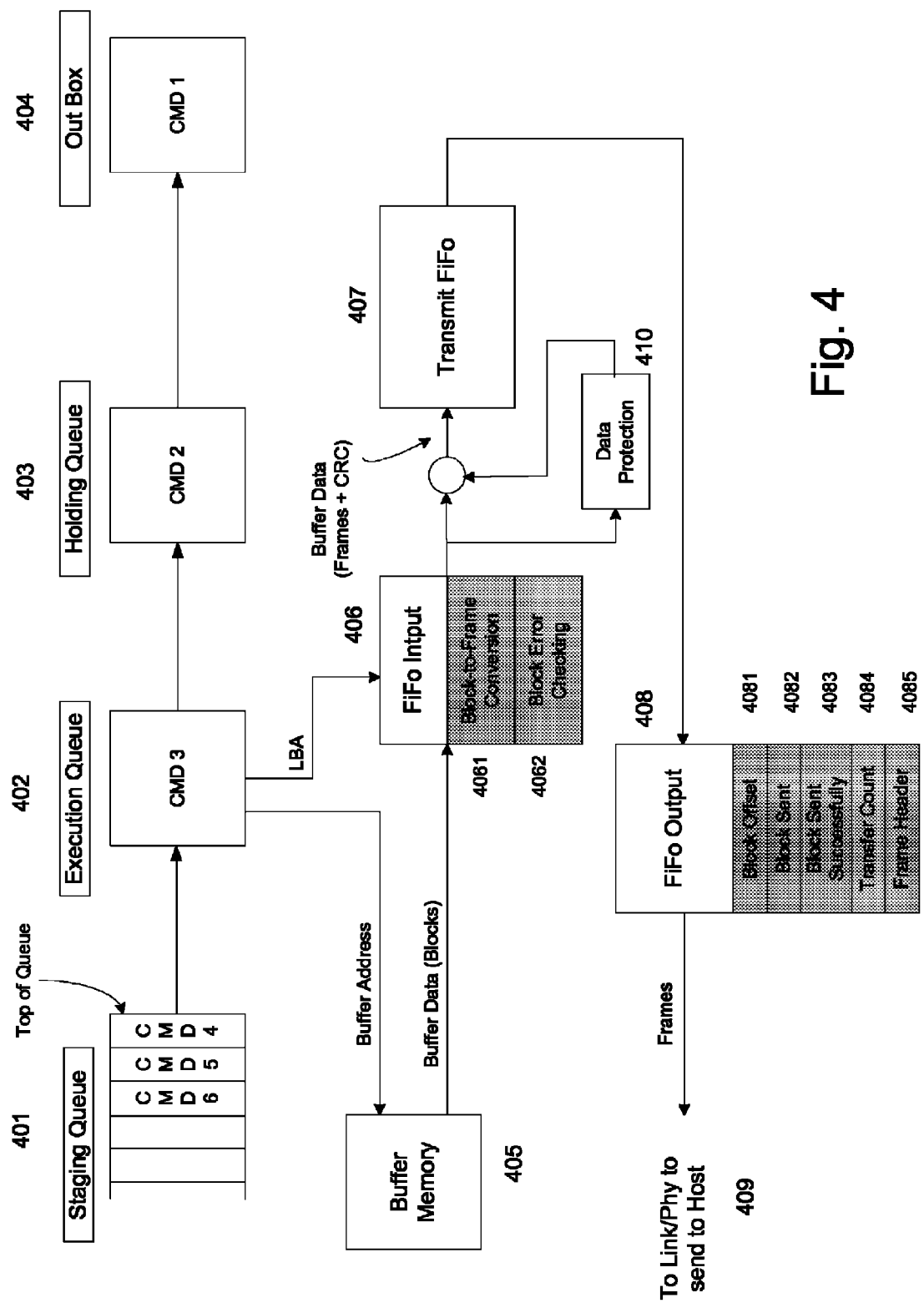
FIG. 4 illustrates a system for command queuing for a disk drive according to one aspect of the present invention.

FIG. 4 illustrates a system for command queuing for a disk drive according to one aspect of the present invention. The system may have a first memory 401 for a staging queue, a second memory 402 for an execution queue, and a third memory 403 for a holding queue. In one aspect, the memories 401-403 may be FIFOs (First-In-First-Out). In one aspect, the memories 401-403 may be part of the same memory device. When a command is completed without error, it may move to an out box 404. The data to be transmitted may be read from a buffer memory 405 in a disk drive. When a command is being executed, the buffer address of data blocks to be transmitted may be used to locate the data in the buffer memory 405, and the data may be transmitted to a host via an FIFO input 406 of a transmit FIFO 407, the transmit FIFO 407, an FIFO output 408 of the transmit FIFO 407, and a Link/Phy layer 409.

The FIFO input 406 may receive data from the buffer memory 405. In one aspect, the buffer data may be received in blocks. The FIFO input 406 may have a block-to-frame conversion module 4061 for converting the buffer data from blocks into frames, and a block error checking module 4062 for checking if there is any error in a data block.

A data protection module 410 may be used for data integrity check. In one aspect, a CRC (Cyclic Redundancy Check) word may be added to the data frames from the FIFO input 406.

The FIFO output 408 may track information of successfully transmitted data, so that if there is an error in the data transmission, the system may accurately backtrack and restart from the point where data were last known to have been successfully sent to the host. The FIFO output 408 may keep the following values during the operation: a block offset 4081, a number of blocks sent 4082, a number of blocks sent successfully 4083, a number of bytes to transfer 4084, and a frame header 4085.

The number of blocks sent 4082 may track the number of blocks sent but not acknowledged as received error-free at the host. The host may not acknowledge each frame as it arrives but may accumulate many frames before sending the acknowledgement. These frames may have their block count accounted for in 4082, and when the acknowledgement eventually arrives, the value in 4082 may be used to update the number of blocks sent successfully 4083. If an error occurs in the transmission since the last acknowledgement, the value in 4082 may be simply discarded.

The number of bytes to transfer 4084 may track the amount of data sent to the host. It may double-check the amount of data gathered from the buffer 405 through the FIFO input 406 and the Transmit FIFO 407.

The Relative Offset/parameter field in the Frame Header 4085 may identify where in the whole transfer the data in this frame belongs and may be updated as each byte is sent to the host.

Each new command may initiate the following operations in the FIFO output box 408:

a) The block offset 4081 may be set to the block size of data in the command;

b) The number of blocks sent 4082 may be cleared to zero;

c) The number of blocks sent successfully 4083 may be cleared to zero;

d) The number of bytes to transfer 4084 may be set to the transfer size in bytes; and e) A Relative Offset/Parameter field in the frame header 4085 may be set to zero or to an initial value by the firmware for the first command, or may be a continuation of the value from the previous command.

As each word of payload leaves the transmit FIFO 407, the following changes may take place in the FIFO output 408:

a) The block offset 4081 may decrement by the amount of data transmitted in a block. Once it reaches zero, it is reloaded with the size of the data block in the command;

b) The number of blocks sent 4082 may increment by 1 each time the block offset 4081 counts down to zero;

c) The number of blocks sent successfully 4083 may be updated by the number of blocks sent in a frame which the host has indicated being received error-free;

d) The number of bytes to transfer 4084 may decrement by the amount of data transmitted. Once it reaches zero, all data for the command have been sent; and e) The Relative Offset/Parameter field may increment by the amount of data.

Figure 5:
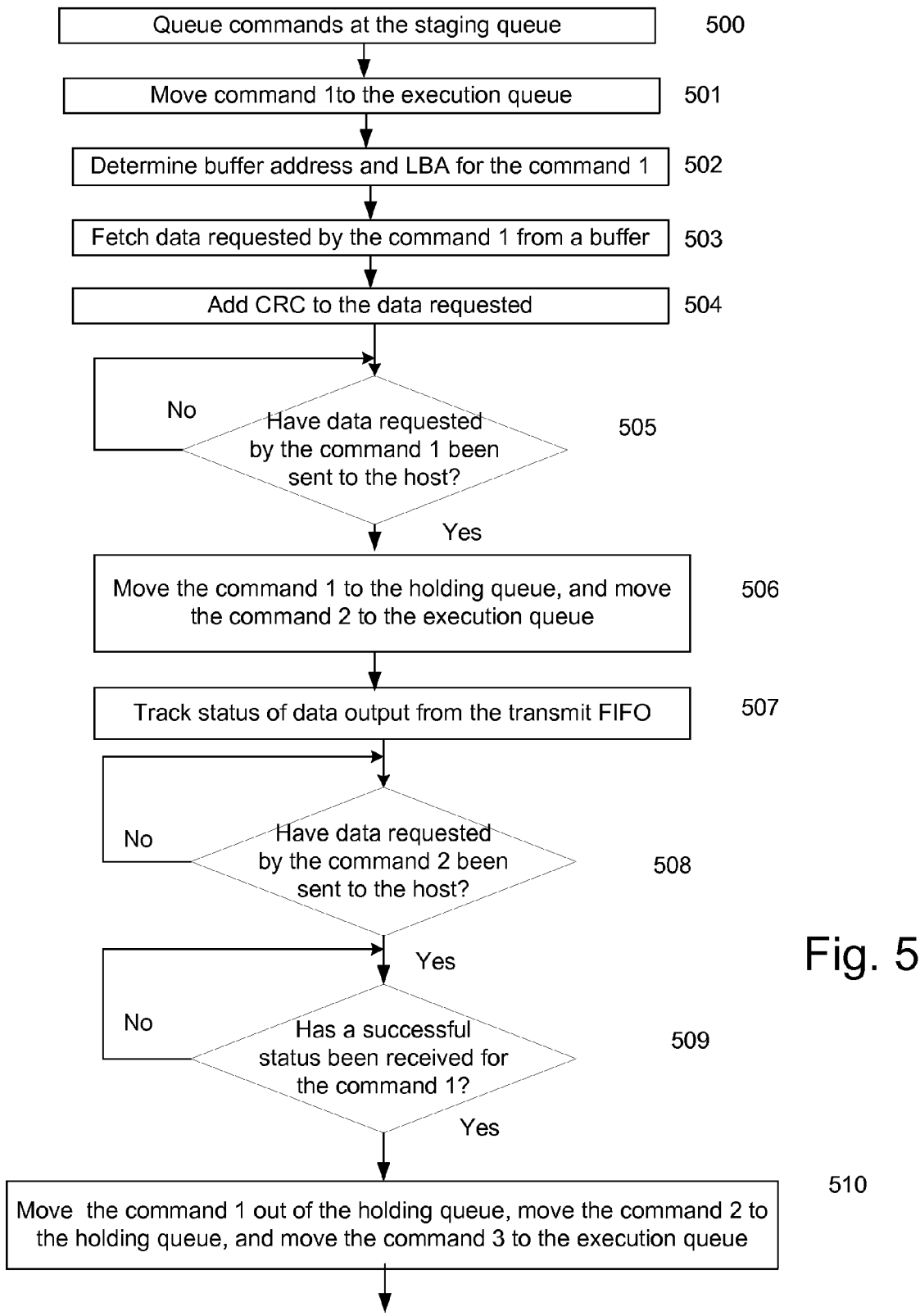
FIG. 5 illustrates a flowchart of a successful command queuing operation for a disk drive according to one aspect of the present invention.

FIG. 5 illustrates a flowchart of a successful command queuing operation for a disk drive according to one aspect of the present disclosure. The method may be used in the system shown in FIG. 4.

Firmware may write commands 1-6 to a staging queue at 500. Each command may include: an initial buffer address, an initial LBA (Logical Block Address), a Skip LBA (number of LBA to skip) and an integral number of blocks to transfer. The block size, e.g., in bytes, may be a static value for the whole operation, and may not be a part of the command. The block size and number of blocks may be used to generate the number of bytes to transfer 4084.

At 501, command 1 may bubble up to the front of the staging queue, initiate a request for data transfer and move to the execution queue.

At 502, a buffer address and an LBA may be generated for command 1 based on the following equations:

$$\text{Buffer address} = \text{initial buffer address} + (\text{block size})^* (\text{Skip LBA}) \quad (1)$$

$$\text{LBA} = \text{initial LBA} + \text{Skip LBA} \quad (2)$$

Data to be transferred may be read from a location in the buffer memory 405 pointed to by the buffer address and the LBA may be used as the seed to check integrity of data coming from the buffer memory 405. The initial buffer address, initial LBA, Skip LBA and number of blocks to transfer may be saved in the execution queue.

At 503, data blocks requested by command 1 may be fetched from the buffer memory 405 and sent to the transmit FIFO 407. The FIFO input 406 may convert incoming data, in blocks, into data in the size of a designated frame payload.

At 504, a CRC word may be added by the data protection module 410 to each frame payload from the FIFO input 406 to aid in error detection.

If all data requested by command 1 have been sent to the transmit FIFO 407 at 505, then command 1 may move from the execution queue in the memory 402 to the holding queue in the memory 403 at 506. Command 1's initial buffer address, initial LBA, Skip LBA and number of blocks to transfer may also move from the execution queue to the holding queue.

At the same time, command 2 may move from the staging queue to the execution queue, and data requested by command 2 may start to be fetched.

At 507, at the FIFO output 408, each frame payload of data leaving the FIFO 407 may be preceded by a header and sent to the Link/Phy 409 on its way to the host. The FIFO output 408 may track the block offset 4081 in a block; track the number of blocks sent 4082; track the number of blocks sent successfully 4083; update the number of bytes to transfer 4084; and update the frame header 4085 for the next frame.

If the host acknowledges that all data for command 1 have been successfully received at 508, command 1 may move from the holding queue to an out box at 509, where it may be serviced/discarded by the hardware or examined by the firmware. Meanwhile, if data transfer for command 2 is completed at 510, at 511, command 2 may go to the holding queue, command 3 may go to the execution queue, and command 4 may percolate to the front of the staging queue. FIGS. 3D and 4 show the status of the commands at this moment.

Figure 6:
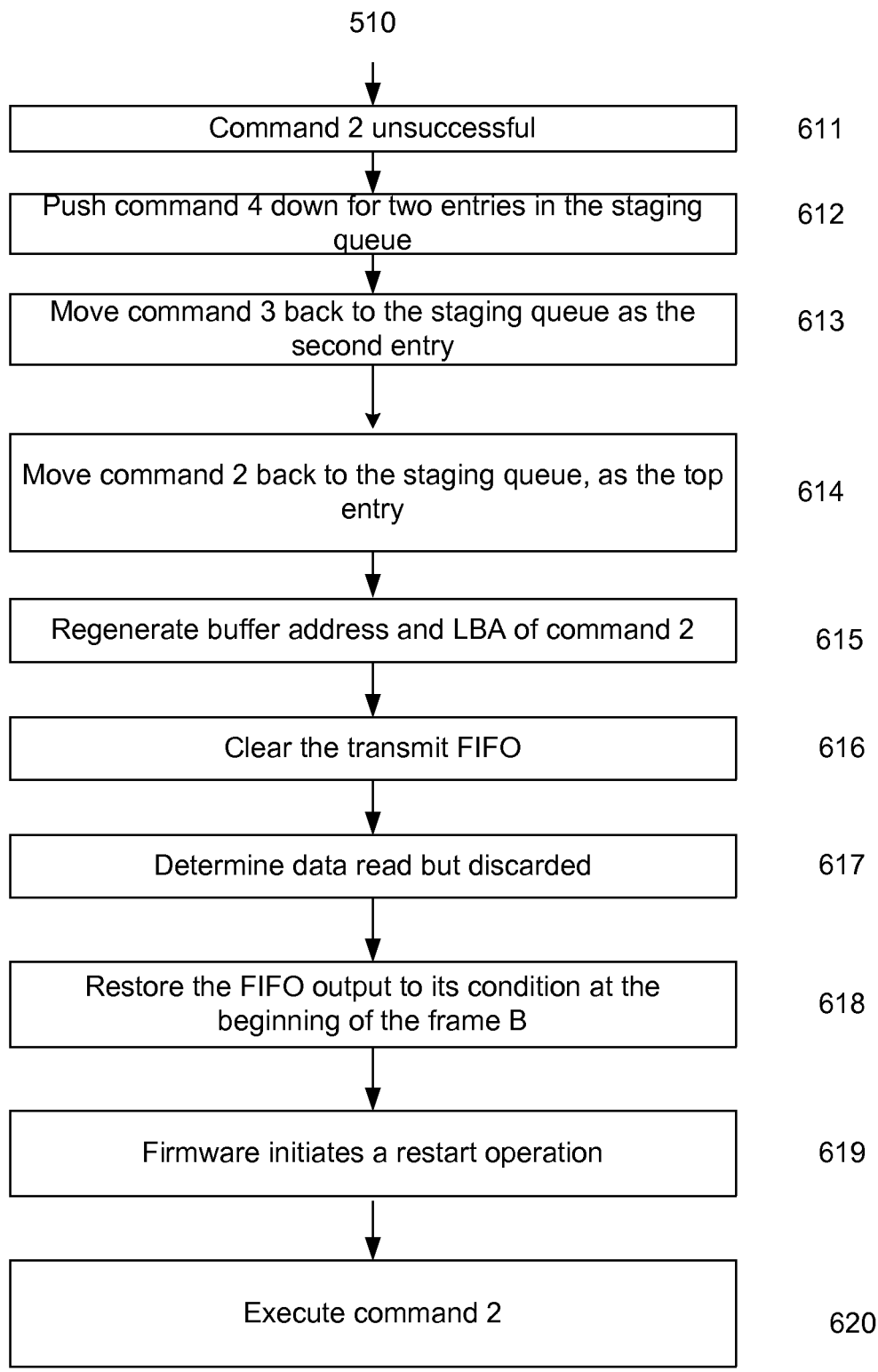
FIG. 6 illustrates a flowchart of a restart operation when there is an error in a command queuing operation according to one aspect of the present invention.

A host may not always receive the data correctly, e.g., when a frame is lost or corrupted in transmission. In this scenario, the command queuing operation may have to be suspended and a restart operation may need to begin to transfer the data which were not successfully transmitted. FIG. 6 illustrates a flowchart of a restart operation when there is an error in a command queuing operation according to one aspect of the present disclosure.

The process may follow 511. At 511, command 1 may receive a successful status and move to the out box 404, all data for command 2 have been sent to the transmit FIFO 407 and command 2 may move to the holding queue, command 3 may initiate a request for data transfer and move to the execution queue, and command 4 may percolate to the front of the staging queue.

At 611, while data requested by command 3 are being sent to the transmit FIFO 407, the firmware may receive from the host an unsuccessful status for command 2. For example, frame B shown in FIG. 1 may have a transmission error. Since frame A has been transmitted successfully, blocks 1 and 2 have been received by the host, and the beginning part of block 3 may have been received successfully too. But the remaining part of block 3, blocks 4 and 5, and the beginning part of block 6 may have transmission error.

At 612, data transmission for command 3 may stop and the operation may return to the beginning of command 2. The content of the staging queue may be pushed down by two entries, i.e. command 4 may be pushed from the front of queue to the third entry from the front of queue.

At 613, command 3 in the execution queue may be written back to the staging queue, as the second entry from the front of the queue.

At 614, command 2 in the holding queue may be put back into the staging queue as the front entry, together with its initial buffer address, initial LBA, Skip LBA and number of blocks to transfer.

At 615, the buffer address and LBA for command 2 may be regenerated according to equations (1) and (2). In one aspect, since the host has indicated that frame A was received successfully, the buffer address and LBA may be adjusted for blocks 1 and 2 that were sent successfully, so that they will not be sent again. The adjusted LBA may be used to seed the data integrity check logic.

At 616, the pipeline and transmit FIFO 407 may be cleared of data.

At 617, the block offset 4081 from the FIFO output 408 may determine the amount of data in block 3 that were read but discarded. In one aspect, data may be fetched from the buffer memory 405 from the beginning of block 3 to satisfy the data integrity check requirements, but only data after the block offset 4081 may be resent to the transmit FIFO 407.

At 618, the FIFO output 408 may be restored to its condition at the beginning of frame B. The values of the block offset 4081, the number of blocks sent 4082, the number of blocks sent successfully 4083, the number of bytes to transfer 4084, and the frame header 4085 may be restored exactly as when frame B was last built. The number of bytes to transfer 4084 may be generated based on the following formula:

((number of blocks to transfer−number of blocks sent successfully 4083)×block size)−block offset 4081

The Relative Offset/Parameter value may be generated based on the following formula:

Initial Relative Offset/Parameter+(number of blocks sent successfully 4083×block size)+block offset 4081

At 619, the firmware may initiate a restart operation so that the hardware knows to check for the block offset 4081, and the number of blocks sent successfully 4083, as opposed to a start operation where such values do not need to be checked.

At 620, command 2 may move from the front of the staging queue to the execution queue and the data transmission process may restart from the beginning of frame B.

In addition to disk drives, the present disclosure may also be used in other storage devices, e.g., solid state drives. Accordingly, as used herein the term "disk drive" includes solid state drives.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A system for command queuing for a storage device, comprising:
   a first queue for executing commands for transferring data between the storage device and a host; and
   a second queue for storing a command received from the first queue after execution of the command has initiated a transfer of data between the storage device and the host but before a status report for the command is accessible.

2. The system of claim 1, wherein the storage device is a disk drive or a solid state drive.

3. The system of claim 1, wherein the first queue is an execution queue and the second queue is a holding queue.

4. The system of claim 1 further comprising a third queue for staging the commands prior to execution and wherein the first queue receives the command from the third queue.

5. The system of claim 1, further comprising a memory for temporarily storing the data transferred between the storage device and the host pursuant to the commands.

6. The system of claim 5, wherein the memory has an output control for tracking frames of data output from the memory, the output control configured to maintain a frame header associated with at least one of the frames of data output or to be output from the memory.

7. The system of claim 5, wherein the memory has an output control for tracking data output from the memory, the output control configured to track: a block offset in a data block sent from the memory; a number of blocks sent from the memory; a number of blocks sent successfully from the memory; or a number of bytes to transfer.

8. A method comprising:
   moving a command, the command for a data transfer between a storage device and a host, from an execution queue to a holding queue responsive to execution of the command initiating the data transfer and prior to determining that there is or is not an error in the data transfer;

determining that there is or is not an error in the data transfer; and responsive to determining that there is not an error in the data transfer, moving the command out of the holding queue; or responsive to determining that there is an error in the data transfer, moving the command from the holding queue to the execution queue.

9. The method of claim 8, wherein the command includes an initial buffer address, an initial logical block address, or a skip logical block address.

10. The method of claim 8, wherein moving the command out of the holding queue moves the command into an outbox.

11. The method of claim 8, wherein the storage device is a disk drive or a solid state drive.

12. The method of claim 8, wherein the command is a first command and further comprising executing one or more other commands prior to determining that there is or is not an error in the data transfer and, responsive to determining there is an error in the data transfer, re-executing the first command and then re-executing the one or more other commands.

13. The method of claim 12, wherein re-executing the first command includes checking for a block offset associated with the data transfer between the storage device and the host.

14. The method of claim 12, wherein re-executing the first command and then re-executing the one or more other commands re-executes those of the one or more other commands performed after a last command known to be successfully completed.

15. A method comprising:
executing, from a first queue, a first command to initiate transfer of first data from a storage device to a host;

moving, to a second queue, the first command after the first data is received from the storage device; and executing, from the first queue and before a status report indicating that the first data has been transmitted to the host is accessible, a second command to initiate transfer of second data from the storage device to the host.

16. The method of claim 15, wherein the first queue is an execution queue and the second queue is a holding queue configured to maintain commands until a status report associated with a respective command is accessible.

17. The method of claim 15, wherein the method is performed by a controller of a disk drive or a solid state drive.

18. The method of claim 15 further comprising, in response to the status report becoming accessible and indicating that the first data was not successfully transmitted to the host, halting execution of the second command and moving the first command from the second queue to the first queue for re-execution.

19. The method of claim 18, wherein re-execution of the first command includes determining an amount of the first data successfully transferred to the host.

20. The method of claim 19, wherein determining the amount of the first data successfully transferred to the host is based on a block offset, a number of blocks transmitted to the host, or a number of bytes to transfer in the first command.

* * * * *